United States Patent [19]

Pierret, deceased et al.

[11] Patent Number: 4,516,734
[45] Date of Patent: May 14, 1985

[54] METHOD FOR LOADING AUTOMATICALLY MACHINES FOR TREATING BULK MATERIALS AND DEVICE FOR WORKING SUCH METHOD

[76] Inventors: Luc A. Pierret, deceased, late of Corbion, Belgium; by Joseph Robert, administrator, rue du Tambour, 32, Corbion (Bouillon), Belgium; Hubert Pierret, rue du Tambour 29, Corbion (Bouillon), Belgium; Gabriel L. Pierret, rue du Tambour 33, Corbion (Bouillon), Belgium; Maurice J. Pierret, rue de l'Eglise 15, Corbion (Bouillon), Belgium; Jean-Marie M. Pierret, rue du Sommet 14, Corbion (Bouillon), Belgium

[21] Appl. No.: 449,855
[22] Filed: Dec. 15, 1982
[30] Foreign Application Priority Data Dec. 16, 1981 [BE] Belgium .............................. 0/206850

[51] Int. Cl.³ ............................................ B02C 18/02
[52] U.S. Cl. ................................ 241/283; 241/101 A; 241/285 A
[58] Field of Search ................ 19/80 R, 80 A, 81, 82, 19/97.5; 241/3, 283, 30, 285 B, 194, 27, 101 A, 285 A

[56] References Cited

U.S. PATENT DOCUMENTS 2,646,913 7/1953 Goldberg et al. ............... 19/81 X
3,330,319 7/1967 Tschantz ........................ 241/283
4,202,503 5/1980 Parkinson et al. ............... 241/194
4,281,437 8/1981 Marx .......................... 241/101 A X

FOREIGN PATENT DOCUMENTS 158377 8/1903 Fed. Rep. of Germany .
2295142 7/1976 France .
444751 2/1968 Switzerland .
770949 10/1980 U.S.S.R. .

Primary Examiner—Mark Rosenbaum
Attorney, Agent, or Firm—Cushman, Darby & Cushman

[57] ABSTRACT

There is described a method and apparatus for loading automatically, machines treating bulk materials in which from the bottom of a material mass is extracted, with projecting elements, an amount of material to form a strip. The strip is fed to the treating machines. The apparatus comprises arranging the projecting elements into at least two rows extending along the strip movement direction, and imparting to at least one element row, an alternating movement along the strip movement direction.

16 Claims, 12 Drawing Figures

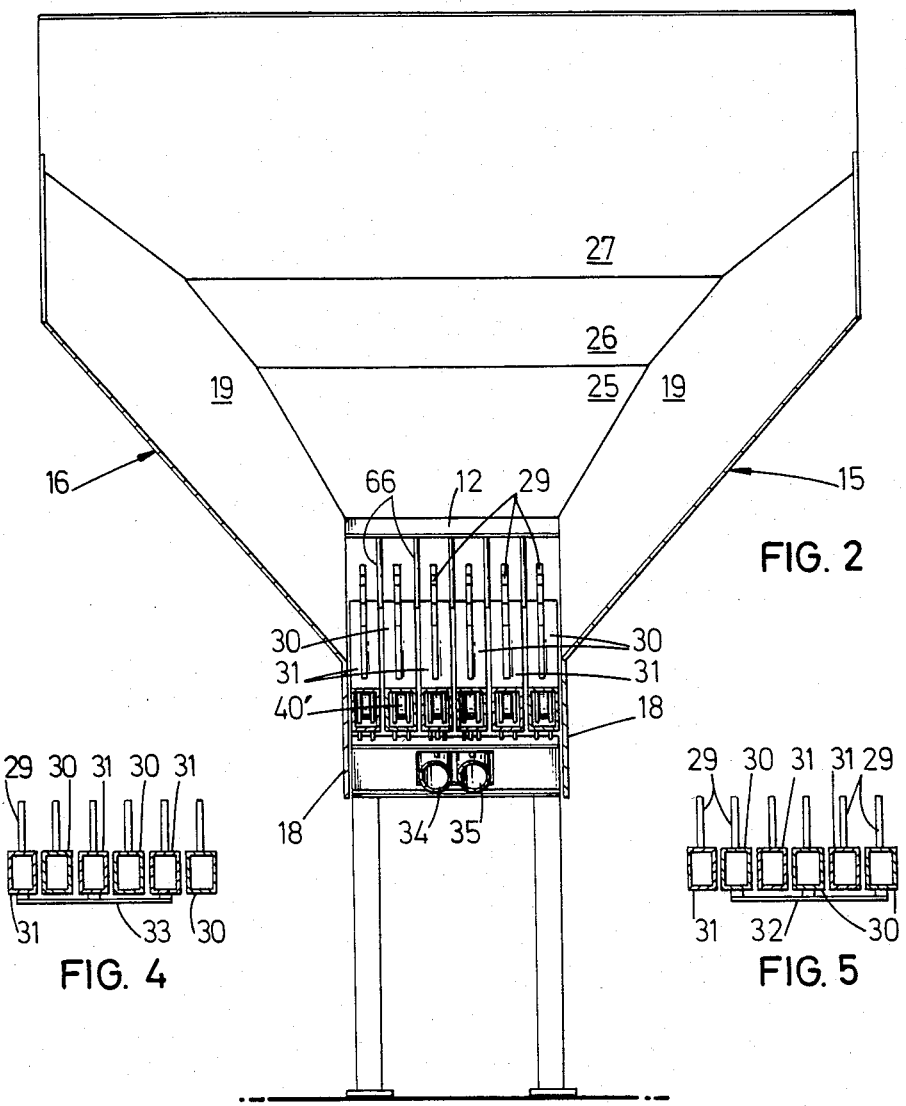
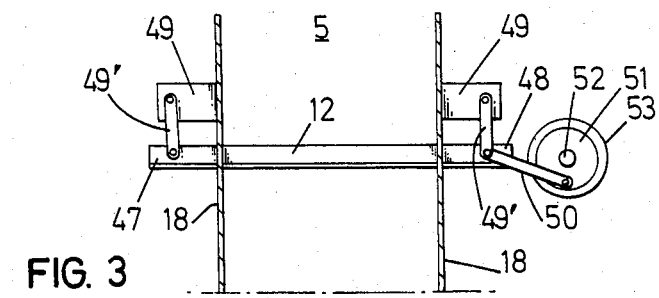
FIG. 2
FIG. 4
FIG. 5
FIG. 3

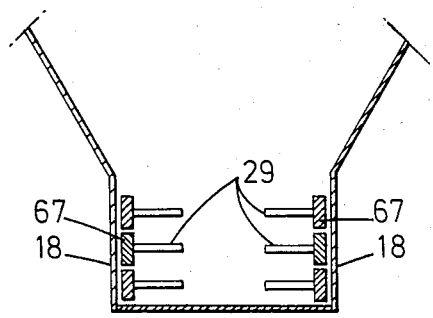
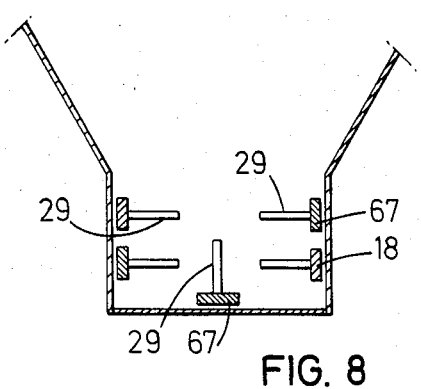
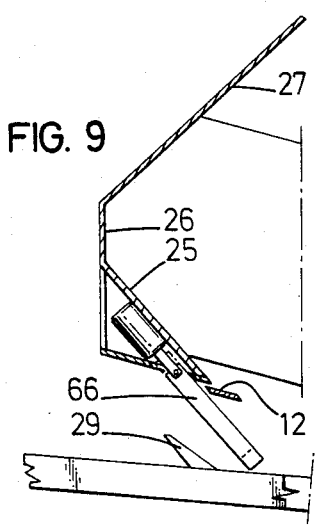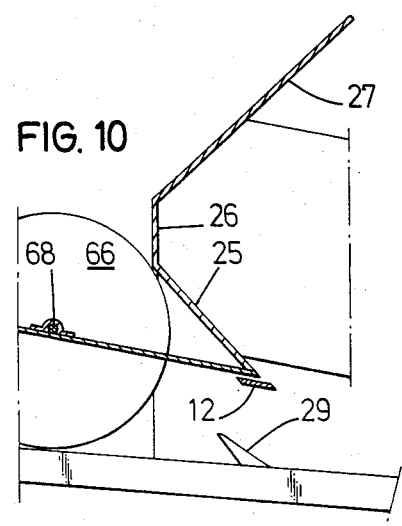
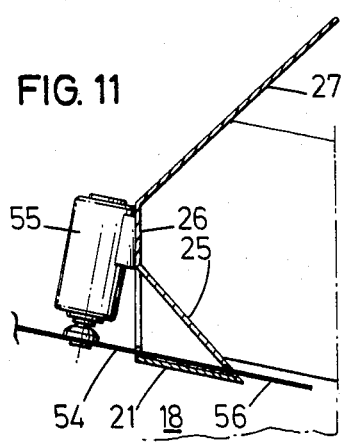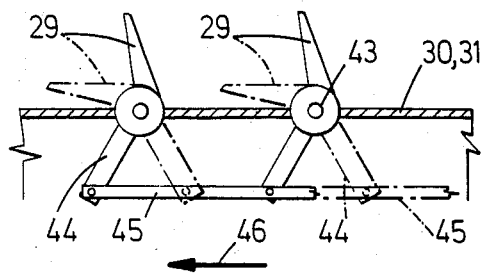

METHOD FOR LOADING AUTOMATICALLY MACHINES FOR TREATING BULK MATERIALS AND DEVICE FOR WORKING SUCH METHOD

FIELD OF THE INVENTION

This invention relates to a method and apparatus for loading, automatically machines for treating bulk materials. The materials having some length and being generally compressed into bales, particularly materials such as fibers, yarns, remains from woven or unwoven textiles, or plastics. The method and apparatus comprises withdrawing from the bottom of a material mass, by means of projecting elements entering said mass, a portion of material to form therefrom a strip which is conveyed to said machines.

BACKGROUND OF THE INVENTION

Machines for treating the above-defined materials are presently generally fed by hand, which has various drawbacks, namely: continuous attendance of workpeople next to the machines, hard work, irregular feeding of said machines due to difficult handling of the materials being treated, fibers getting loose from the mass to be accumulated around said machines and comprising a danger when uncontrolled fiber accumulations are caught by moving parts of said machines.

It has also been attempted to automate the loading of said machines by means of endless belts provided with projecting elements which retract below the belt level as they reach the belt end. This way of working has also many drawbacks, namely locking of the elements inside the recesses thereof due to material entering such recesses, and the need for an and delicate mechanism for retracting said projecting elements.

SUMMARY OF THE INVENTION

The invention has for an object to obviate such drawbacks and to provide a method for loading, automatically, machines while allowing on the one hand, the very substantial lowering of the number of workers provided for the loading, while insuring a continuous and regular loading of said machines without letting materials escape from the material mass while allowing the machines to be treated, and on the other hand being workable by means of rugged equipment which is not subject to failures.

For this purpose according to the invention, said method comprises arranging projecting elements in at least two rows which extend along the movement direction of the strip, and imparting at least to the one element row, an alternating movement along the strip movement direction to cause the movable element row to convey material along the strip movement direction as the row moves along such a direction and the other element row to retain the material to prevent same from moving together with the movable element row as said latter row moves along a direction opposite to the strip movement direction.

According to the invention, both said element rows are moved alternately along the strip movement direction, and said rows are so controlled as to have at least one row either moving along the strip movement direction or standing still, during the complete time interval corresponding to the movement of the other row along a direction opposed to the strip movement direction.

The invention has also as an object a device for the working of the above-defined method.

According to the invention, said device comprises a hopper mounted on a fixed frame, the frame top being open and along the frame edge nearest the machine to be loaded is provided a quadrangular opening extending from the hopper bottom, the cross-section of which substantially corresponds to the cross-section of that material strip to be formed, at least two rows of projecting elements arranged in the hopper bottom, substantially at right angle to that hopper edge along which said opening is provided and at a lower level than that opening edge opposite the hopper bottom, at least the one projecting element row being movable, control means to drive the movable element row with an alternating motion along the lengthwise axis of the strip to be formed, said motion having such a magnitude that the projecting elements from said row move from that hopper wall opposite said opening to beyond said opening, and means to feed material to said hopper.

In one exemplary embodiment of the invention, said device comprises a knife arranged inside the hopper and mounted thereon adjacent said opening, substantially in parallel relationship with the hopper bottom and at a distance from said bottom which is slightly shorter than the spacing between that opening edge opposite said bottom, and at a higher level than the projecting elements to let the movable elements pass below said knife as they drive the material beyond the opening.

In an advantageous exemplary embodiment of the invention, the hopper bottom is open and shaped as a quadrilateral with four right angles, said opening being provided along the one quadrilateral side, and the projecting element rows being supported by at least two series of movable bars closing-off the hopper bottom and extending at right angle to said opening, guides being provided to let the bars move along the lengthwise axis thereof, the size of said bars, as considered in parallel relationship with the lengthwise direction thereof, being longer than the corresponding size of the hopper bottom, in such a way that said bars always close-off the hopper bottom whatever be the position thereof, the bars in each one of both series thereof being connected together and the control means provided to drive each such bar series with a to-and-fro movement being so arranged that as the one bar series moves in one direction, the other bar series moves in the opposite direction, said control means being moreover so arranged that during the complete time interval where the one bar series moves in the direction opposite to the strip movement direction, the other bar series either moves in the same direction as the material strip or is stopped.

In a particularly advantageous exemplary embodiment of the invention, the hopper side walls extending along those quadrilateral sides adjacent to the side where said opening is provided, each have a vertical zone extending from the hopper bottom to a height which is at least equal to the opening height, said vertical zone being extended with a slanting zone to form the hopper flare, the opening size as considered at right angle to said bar movement direction being substantially equal to the spacing between said vertical zones.

BRIEF DESCRIPTION OF THE INVENTION

Other details and features of the invention will stand out from the following description, given by way of non limitative example and with reference to the accompanying drawings, in which:

FIG. 2 is a section view along line II—II in FIG. 1, on a larger scale.

FIG. 3 is a part section view along line III—III in FIG. 1, showing the drive mechanism for the knife.

FIG. 4 and 5 are detail section views along lines IV—IV and V—V in FIG. 1.

FIGS. 7 and 8 are diagrammatic section views similar to FIG. 2, showing variations of the hopper and projecting elements.

FIG. 9 is an elevation view on a larger scale showing a variation in a detail from FIG. 1.

FIG. 10 is a view similar to FIG. 9, showing a variation of the detail shown therein.

FIG. 11 is a part view similar to FIGS. 1 and 6, showing another embodiment of the knife as shown in FIGS. 1 to 3.

FIG. 12 is a part view similar to FIGS. 1 and 6, on a larger scale than FIG. 6, showing a variation of the projecting elements as shown in FIGS. 1 and 6.

In the various figures, the same reference numerals pertain to identical or similar elements.

Figure 1:
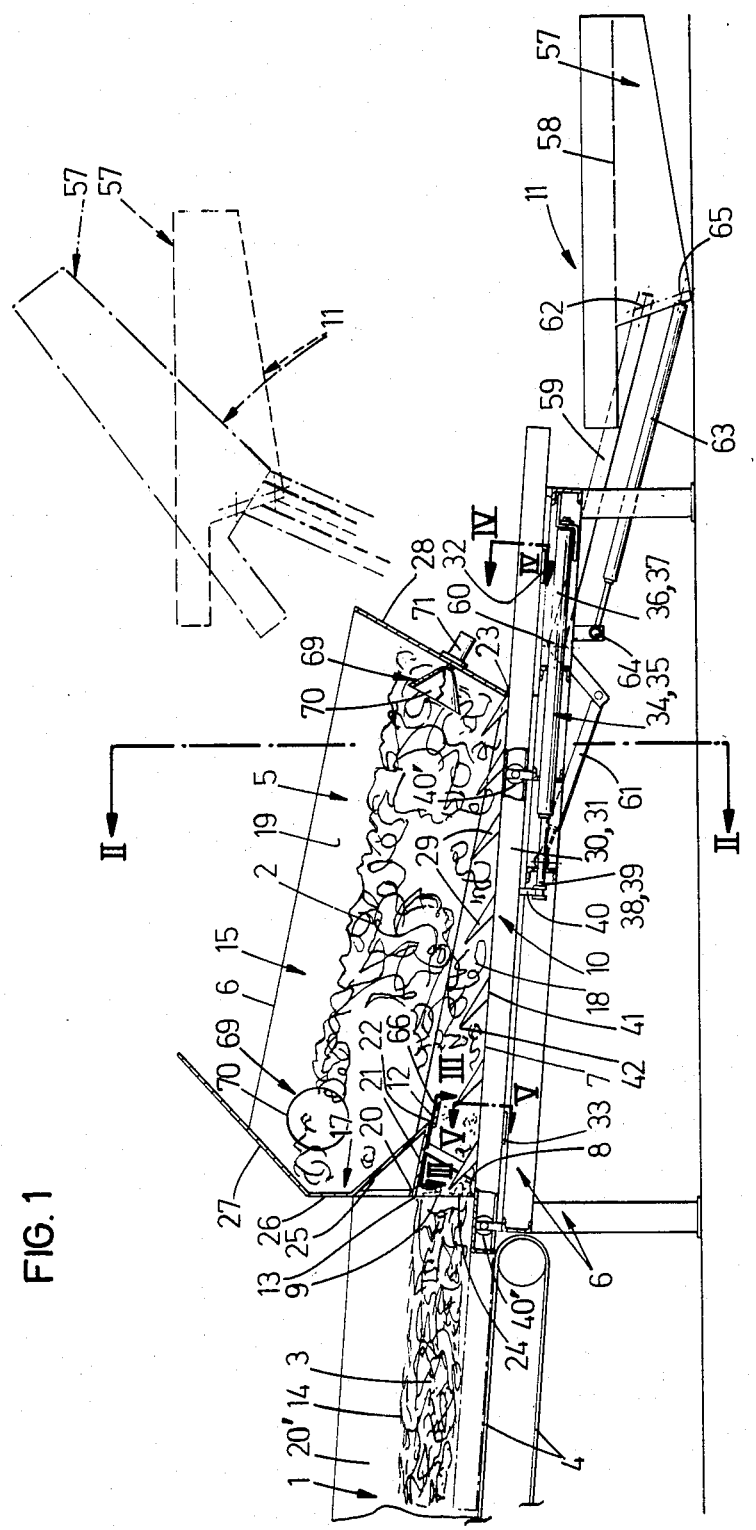
FIG. 1 is an elevation section view with parts broken-away, of the device according to the invention as associated to a machine to be fed.

The method according to the invention and shown in the drawings pertains to the automatic feeding or loading with fibers, of a machine 1 such as a fiber cutter, said method comprising extracting continuously fibers from a material mass 2 to form a strip 3 with a defined cross-section corresponding to that material cross-section which can be received by the cutter, and feeding regularly said strip 3 to the cutter until the moment where the strip is taken over by the cutter conveying belt 4. Such material extracting is obtained by means of projecting elements 29 entering the mass, part at least of said elements being movable and arraying due to the motion thereof, the fibers to form the strip and to feed same along the direction as defined above. The method according to the invention further comprises arranging said projecting elements 29 in at least two rows extending along the movement direction of said strip 3, and imparting at least to the one element row, an alternating motion along the strip movement direction to let said movable element row drive material along the strip movement direction when said row moves along said direction, and the other element row retains the material to prevent same moving together with the movable element row when said row moves along the direction opposite to the strip movement direction.

According to the invention, both said element rows may be moved advantageously along the movement direction of said strip 3, and said rows may be so controlled as to have the one row at least either move along the strip movement direction, or be stopped during the whole time interval where the other row moves along the opposite direction to the strip.

According to the invention, the extracted material is guided by means of zones 18 from the side walls of a hopper 5 containing the material mass, and by means of guides 20' from the machines, on either side of said element rows and over a distance at least equal to the movement magnitude of said rows, to form the side edges of said strip, and with a knife 12, the material being extracted is cut above said elements 29 and in a location lying upstream of the stroke end of said element rows as same move along the direction of strip 3 to define the strip upper surface 14 and adjust the thickness thereof, the excess material being cut is returned to the material mass.

To improve stretching and directing of the fibers, as well as to cut very long fibers, the material strip is cut by means of a cutting element 66, which cuts material strip between the cutting location (knife 12) and the stroke of the element rows as they move along the strip movement direction; The cutting with element 66 being made in a substantially vertical plane in parallel relationship with the strip lengthwise axis, between said element rows.

Figure 6:
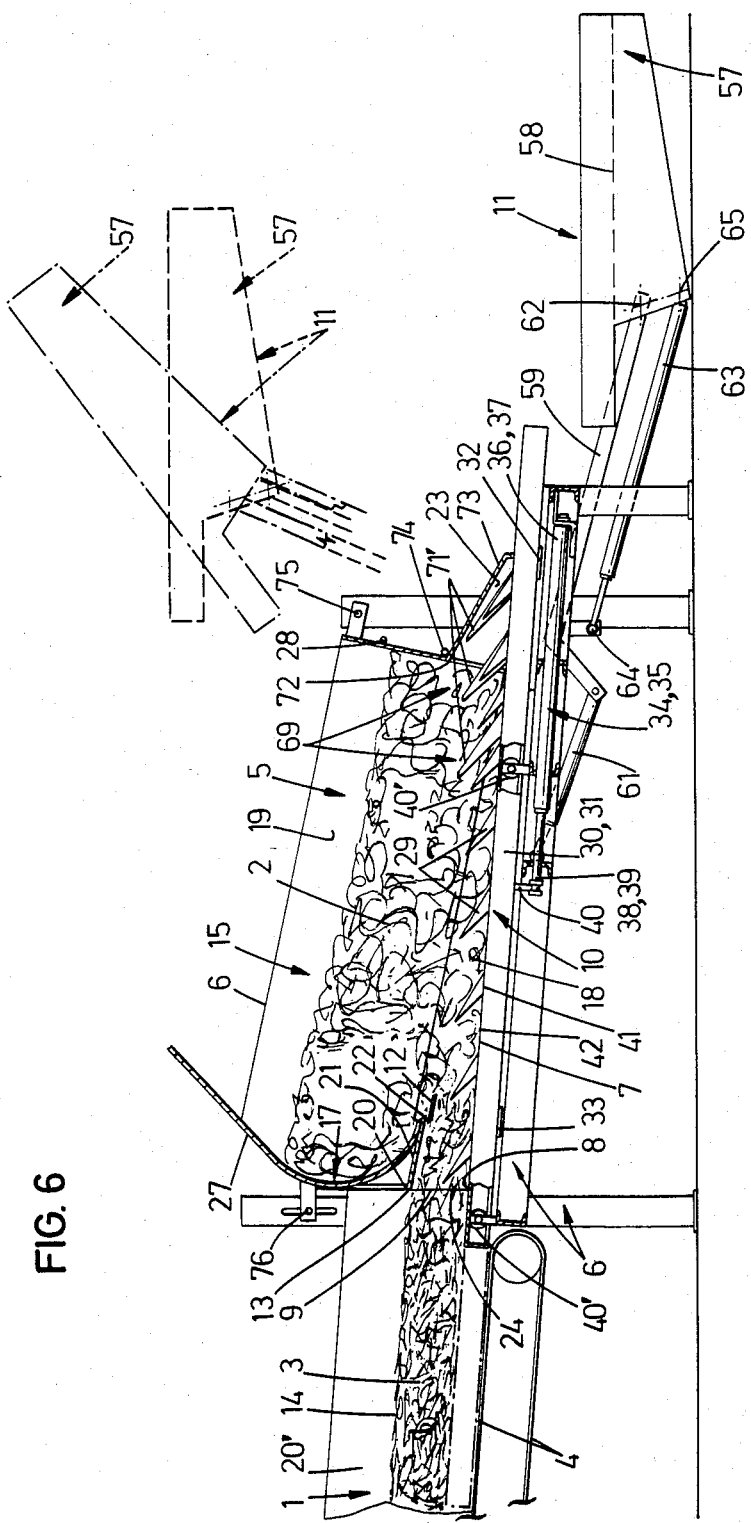
FIG. 6 is a view similar to FIG. 1 showing another embodiment of the device as shown in FIGS. 1 to 5.

The device according to the invention for the working of the above method, comprises as shown in FIGS. 1 and 6, a hopper 5 mounted on a fixed frame 6, the top 6' and bottom 7 of which are open and which is provided along an edge 8 of nearest machine 1, with a quadrangular opening 9 extending from hopper bottom 7, the cross-section of opening 9 corresponds substantially to the cross-section of the fiber strip 3 to be formed. The device also includes movable means 10 bearing the projecting elements 29 which are arranged at the hopper bottom to close-off said bottom, and on which bears the material mass 2 contained in the hopper, said means 10 and the elements 29 which are also arranged to separate fibers from the mass, being controlled in such a way that the alternating motion thereof along the lengthwise axis of strip 3 which causes the fibers to be separated from said mass 2 as the elements 29 move inside hopper 5 towards opening 9 provided therein and beyond said opening towards the conveying belt 4 from the machine to be loaded. Means 11 is provided to feed material to said hopper 5, said means 11 being shown in FIGS. 1 and 6 in plain lines, dot-and-dash and broken lines in various positions.

The device advantageously comprises a knife 12 arranged inside the hopper adjacent opening 9 in parallel relationship with said movable means 10 and at a distance from hopper bottom 7 slightly shorter than the spacing betwen said bottom 7 and edge 13 from opening 9, opposite said bottom, said knife being so arranged as to cut the fibers taken along by the movable means 10 inside the hopper, to define the upper surface 14 of said strip 3.

Bottom 7 of hopper 5 is a quadrilateral with four right angles and opening 9 is provided along one quadrilateral side. The side walls 15 and 16 of hopper 5 adjacent to the side wall 17 the opening 9 is provided in, each have a vertical zone 18 extending from hopper bottom 7 up to a height at least equal to the height of opening 9, the vertical zones 18 are extended with slanting zones 19 to form the hopper flare. The movable means is controlled so as to move along a direction in parallel relationship with said vertical zones 18 from the side walls. The size of opening 9, which is at a right angle to said direction, being equal to the spacing between the vertical zones 18 from the side walls and slightly shorter than the spacing between the machine side guides 20' bordering said conveying belt 4.

To enable a good output of strip 3 from the hopper, there is provided along edge 20 of opening 9, a guide sheet 21 which extends inside the hopper and joins together the vertical zones 18 from hopper side walls 15 and 16. The knife 12 is arranged near edge 22 of said sheet 21 and the spacing between said edge and hopper bottom 7 is slightly shorter than the spacing between edge of sheet 21 connected to edge 20 of opening 9, and said bottom 7.

The frame 6 lies at such an angle that means 10 lie in the extension of the upper run of the machine conveying belt 4. To insure good extracting of the fibers from the mass without causing a material bridge or material choking inside the hopper, said vertical zones 18 from side walls 15 and 16 are in the shape of a right-angled triangle the apex of which lies on side 23 of the hopper bottom, and the base 24 of which merges with the one edge of opening 9. Side wall 17 of the hopper (FIG. 1) is comprised of a metal sheet bent in three areas 25, 26 and 27 forming between them an angle in the range of 135° C., said bent sheet has for an object to return above said means 10, those fibers moving over knife 12, the bent sheet is connected on the one hand to edge 22 of sheet 21 to form with said sheet an angle in the range of 35°, and on the other hand to side walls 15, 16, said walls having the slanting zones 19 thereof which form the hopper flare. The slanting zones 19 forming with said vertical zones 18, an angle in the range of 45°, the hopper side wall 28 being flat and forming an angle lying between 90° and 150° relative to a horizontal plane.

As shown clearly notably in FIGS. 1 and 6, said movable means 10, the elements 29 of which project outwards the hopper, are so controlled as to have said elements move from hopper side wall 28 towards opening 9 and beyond same, the height of said elements 29 being lower than the spacing between the edge of knife 12 and hopper bottom 7.

In the embodiments as shown in FIGS. 1 to 6, said elements 29 are supported by two series of movable bars 30 and 31 closing-off hopper bottom 7 and arranged in parallel relationship with vertical zones 18 from side walls 15 and 16, the size of said bars, which are in parallel relationship with the movement direction of members 29, being longer than the corresponding size of hopper bottom 7, so that said bars 30 and 31 always close-off hopper bottom 7 whatever their position. The bars from both of said series are connected together by bars 32, 33 to avoid two directly adjacent bars belonging to the same series (see FIGS. 4 and 5), and a jack 34, 35 is provided to control each said bar series with a to-and-fro movement, and to have the one bar series move along one direction as the other bar series moves along the opposite direction. Cylinders 36 and 37 from jacks 34 and 35 lie in parallel relationship and are fast to frame 6, the ends 38 and 39 of the piston rods being each connected to one bar series, through a yoke 40, to insure the movement thereof. The jacks may be so controlled as to have the bar series movement occur at the same speed in each direction, or else as to have the speed of that bar series which moves from opening 9 towards wall 28 be faster than the movement speed of the bar series along the other direction, said bars being guided in the movement thereof by rollers 40' the shafts of which are supported by frame 6.

The control of said jacks 34 and 35 is moreover so arranged as to let both jacks drive both bar series simultaneously along the strip movement direction, but said control prevents the simultaneous movement of both bar series in that direction opposite to the strip movement direction, that is the control only allows during the whole time interval where the one bar series moves from opening 9 towards wall 28, the movement of the other series in opposite direction or else retains said latter series at rest at the stroke end as that series has moved from wall 28 towards opening 9.

To extract fibers from said material mass, said elements 29 are of triangular shape and in the embodiments shown in FIGS. 1 to 6, they are secured to bars 30 and 31 through the base 41 thereof, along a vertical plane which passes through the bar lengthwise axis. The shape of said elements 29 is such that the projection on the bar of apex 42 from the triangle falls outside the base 41 thereof and on the side of that base end which is nearest the opening 9 provided in the hopper.

The elements 29 might be hinged as shown in FIG. 12, on the bars 30 and 31 in such a way as to lie in two end positions, namely a first position shown in plain lines, in which they project relative to the bars as same move from inside the hopper towards opening 9, and a second position shown in broken lines, in which said elements fall back on the bars as same move from said opening 9 towards the inside of the hopper. Said elements 29 are hingedly mounted on the bars by means of a shaft 43 and have an extension 44 lying inside the bars. All of the extensions 44 from the bars are connected by a rigid rod 45 and the rods 45 from a bar series are joined together and controlled simultaneously by a jack. It is noticed that as the jack pushes the rods along the direction of arrow 46, the elements 29 project relative to the bars and said bars move towards hopper opening 9. On the other hand, when the rods are operated by said jack in the direction opposite to arrow 46 and the bars are slowed down, the elements 29 fall back on said bars when moving towards hopper wall 28.

In the embodiments of the device as shown in FIGS. 1 to 3 and 6, the knife 12 is formed by a straight blade the ends 47 and 48 of which lie outside the hopper, said blade lying substantially parallel to hopper bottom 7. Each said blade end is hinged on a support 49 fast to the hopper, through a link 49', blade end 48 being moreover connected to insure a sweeping movement for the blade, to a control link 50 which is driven through an eccentric 51 fast to the shaft 52 of a reduction-gear motor 53.

According to the invention, said knife 12 might also be as shown in FIG. 11, a rotating knife 54 lying substantially in parallel relationship with hopper bottom 7 and controlled by a reduction-gear motor 55, that knife portion 56 projecting inside the hopper having the same function as the straight-blade knife.

It would also be possible according to the invention and as shown in FIGS. 7 and 8, to provide elements 29 arranged substantially at right angle to the zones 18 from said side walls, said elements may be combined with vertical elements 29 (FIG. 8). In such case, the hopper bottom is closed. The elements 29 are secured to bars 67, some bars receiving an alternating motion as described hereinabove, the other bars being fixed or else all of said bars are movable and so controlled as to always have bars which move along the strip direction or which are stopped when bars are moving in the direction opposite to the strip.

The cutting elements 66 supported by the hopper upstream of knife 12 and arranged between said elements 29 to cut overlong fibers and array the fibers, are either fixed as shown in FIGS. 1 and 2, or movable. In such latter case, said elements 66 may be in the shape of a blade as shown in FIG. 9 and be moved to-and-fro in the way of a jig-saw, or as shown in FIG. 10 in the shape of a disc which is rotated about a shaft 68.

According to the invention, the device advantageously comprises means 69 (FIGS. 1 and 6) so arranged as to insure the lowering of material towards the hopper bottom, while hopper wall 17 (FIG. 6) is advantageously convex to return that material cut by knife 12 to the core of mass 2. Said means 69 shown in FIG. 1 are comprised of movable members 70 of hollow cone shape to let the material entering there be easily released, said members being driven by jacks 71 which cause said members 70 to enter to the core of the material mass to force same to fall on the projecting elements 29. Said means 69 may also be comprised as shown in FIG. 6, of projecting elements 71' similar to elements 29 but with a greater height than said elements 29, and arranged at least on those bars nearest the vertical zones 18 from the hopper side walls. Said elements 71' are so arranged as not to reach the knife 12 at stroke end. The hopper may also be provided according to the invention, to prevent cramming between elements 29 or elements 29 and 71' and hopper wall 28, with a cut-out 72 letting said elements 29 or 69 and 71' (FIG. 6) move beyond said wall 28. To avoid material passing through said cut-out 72, the device comprises a movable hood 73 hinged to wall 28 to close-off said cut-out. Said hood is so arranged as to bear on the bars 30 and 31, whatever their position is, to cover the projecting elements 29 and 71' as they move beyond hopper wall 28, the hood hinge 74 being so provided as to let said hood be moved to free said cut-out and elements 29 and 71' to make the maintenance thereof easier.

To allow adjusting the cross-section of opening 9 which determines the cross-section of strip 3, as well as adjusting the knife 12 and cutting elements 66, the hopper is hinged on the frame about a shaft 75 the axis of which lies at right angle to that vertical plane passing through the lengthwise axis of the one bar 30 or 31. Said shaft 75 lies directly adjacent that hopper side wall 28 opposite to opening 9, in such a way that the swinging of the hopper about the axis thereof allows adjustment of the height of said opening, the frame comprising means 76 for locking the hopper in the selected position.

Said means 11 for feeding material to the hopper are comprised of a bucket 57 hinged on frame 6, and of control means for said bucket arranged on said frame and bucket on either side thereof to let said bucket lie in two end positions, the one position in which the bucket tray 58 lies substantially horizontally and is so spaced from the ground as to make possible discharging thereon that material to be fed to the hopper, and another position in which the bucket is tipped over the hopper to let the material fall by gravity therein. Said control means comprise on either side of frame 6, an angle-lever 59 hinged in 60 on said frame and connected with the one one end thereof, to a jack 61 for raising the bucket, and with the other end thereof, to a hinge 62 provided on said bucket. Said members further comprise on either side of frame 6, a jack 63 for tipping the bucket, which is hinged in 64 on the frame, and in 65 on the bucket.

It must be understood that the invention is in no way limited to the above embodiments and that many changes may be brought thereto without departing from the scope of the invention as defined by the appended claims.

For instance, said knife 12 might be comprised of a band cutting element the driving pulleys of which are mounted outside the hopper, on either side thereof. We claim :

1. An apparatus for automatically loading a machine which treats bulk materials, said bulk materials having some length and including materials such as fibers, yarns, fragments from woven or unwoven textiles, and plastics, said apparatus extracting from the bottom of a material mass, by means of projecting elements entering said mass, an amount of material to be formed into a strip which is to be fed to said machine, said apparatus comprising:
   a hopper having a top and a bottom and four sides and being mounted on a fixed frame, the hopper top and bottom being open and along the hopper edge nearest to the machine to be loaded is provided a quadrangular opening extending from the hopper bottom, the cross-section of said opening substantially corresponding to the cross-section of said strip to be formed, the hopper bottom being shaped as a quadrilateral with four right angles and said opening being provided along one quadrilateral side;
   at least two rows of projecting elements arranged in the hopper bottom, substantially at right angle to the hopper edge along which said opening is provided and at a lower level than the edge of said opening opposite the hopper bottom;
   two movable bars on which are fixed the at least two rows of projecting elements, said two movable bars closing—off the hopper bottom and extending at right angles to said opening;
   guides for causing said two movable bars to move along their lengthwise axis, the length of said bars being longer than the length of the hopper bottom, so that said two movable bars always close-off the hopper bottom;
   control means provided to drive each one of said two movable bars with an alternating motion such that the projecting elements from each row move from the hopper side opposite said opening to beyond said opening, said control means being arranged so that during the time interval where one bar moves from said opening to said hopper side opposite said opening, the other bar moves in the opposite direction or is stopped; and
   means to feed said material to said hopper.

2. An apparatus as claimed in claim 1, in which said projecting elements are arranged in parallel relationship with a vertical plane which passes through the lengthwise axis of the material strip to be formed.

3. An apparatus as claimed in claim 1, which further comprises a knife arranged inside the hopper and mounted thereon adjacent said opening, substantially in parallel relationship with the hopper bottom, and at a distance from said bottom which is slightly shorter than the spacing between the opening edge opposite said bottom and at a higher level than the projecting elements so that the projecting elements pass below said knife as they drive the material beyond the opening.

4. An apparatus as claimed in claim 1, which further comprises, in a zone lying between ends of the at least two rows of projecting elements, at least one cutting element lying between at least two rows of projecting elements.

5. An apparatus as claimed in claim 1, in which the hopper sides extending along the quadrilateral sides adjacent to the one quadrilateral side where said opening is provided, each have a vertical zone extending from the hopper bottom to a height which is at least equal to the height of said opening, each of said vertical zones being extended with a slanting zone to form a hopper flare, the size of the opening, which is at right angles to said bar movement direction, being substantially equal to the spacing between said vertical zones.

6. An apparatus as claimed in claim 5, in which said vertical zones are in the shape of a triangle the apex of which lies on the hopper bottom and on the quadrilateral side opposite the one quadrilateral side provided with said opening, and the base of which merges with the one quadrilateral side provided with said opening.

7. An apparatus as claimed in claim 5, in which the hopper comprises along the edge of said opening opposite the hopper bottom, a guide sheet for the upper surface of the material strip, said guide sheet extending inside the hopper and joining said vertical zones, the knife being arranged adjacent a guide sheet edge which lies opposite said opening, the spacing between said guide sheet edge opposite said opening and the hopper bottom being slightly smaller than the spacing between a guide sheet edge adjacent the opening and said hopper bottom.

8. An apparatus as claimed in claim 7, in which the hopper side lying above said opening is convex and extends from the knife above said guide sheet in such a way as to return the material being cut away from said strip to the material mass bearing on said bars.

9. An apparatus as claimed in claim 1, in which the hopper side opposite said opening is provided with a cut-out to let the projecting elements pass beyond said hopper side opposite said opening as said projecting elements move in the opposite direction to the strip, the size of said cut-out corresponding substantially to the size of said opening.

10. An apparatus as claimed in claim 9, in which the hopper further comprises a movable hood hinged outside the hopper to close-off said cut-out, said hood being arranged so as to cover said projecting elements as they move beyond the hopper side which is provided with the cut-out, the hood hinge being arranged so as to allow movement of said hood for uncovering said cut-out.

11. An apparatus as claimed in claim 1, which further comprises means arranged so as to insure that the material falls down to the hopper bottom.

12. An apparatus as claimed in claim 11, wherein said means is comprised of additional projecting elements which are arranged on the bars nearest the hopper sides which are in parallel relationship with said bars, said additional projecting elements having a height which is higher than said projecting elements and said additional projecting elements being mounted on the bars so that their movement is limited to not reach the knife;

and wherein said hopper side opposite said opening has a cut-out with a height which allows said additional projecting elements to pass therethrough.

13. An apparatus as claimed in claim 12, in which said additional projecting elements are of triangular shape and are secured to the bars with their base along a vertical plane passing through the bar lengthwise axis, the additional projecting elements being shaped so that the projection on the bar of said triangle apex falls outside the triangle base towards said opening.

14. An apparatus as claimed in claim 11, in which said means provided to insure that the material falls to the hopper bottom is comprised of movable members supported by the hopper sides and controlled so as to move between two end positions, one end position being where said movable members engage the hopper sides, and the other end position being where said movable members are moved away from the hopper sides to cause said material mass to fall on the projecting elements.

15. An apparatus as claimed in claim 1, in which said hopper is hinged to the frame about an axis at right angles to the vertical plane passing through the lengthwise axis of one of said bars, said axis lying directly adjacent to the hopper side opposite to said opening, in such a way that swinging of the hopper about said axis allows adjusting the height of said opening, the frame comprising means for locking the hopper in the selected position thereof.

16. An apparatus as claimed in claim 1, in which said means for feeding material to the hopper is comprised of a bucket hinged to said frame, and means for controlling said bucket arranged on said frame to let said bucket take two end positions, a first end position being where the bucket lies substantially horizontally at such a distance from the ground that the material to be fed to the hopper can be discharged into the hopper, and a second position in which said bucket is tipped over the hopper to let the material fall by gravity.

* * * * *